United States Patent
Reber et al.

(10) Patent No.: US 9,122,829 B2
(45) Date of Patent: Sep. 1, 2015

(54) STRESS MIGRATION MITIGATION

(71) Applicants: Douglas M. Reber, Austin, TX (US); Mehul D. Shroff, Austin, TX (US); Edward O. Travis, Austin, TX (US)

(72) Inventors: Douglas M. Reber, Austin, TX (US); Mehul D. Shroff, Austin, TX (US); Edward O. Travis, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/956,044

(22) Filed: Jul. 31, 2013

(65) Prior Publication Data

US 2015/0040092 A1  Feb. 5, 2015

(51) Int. Cl.
G06F 17/50 (2006.01)

(52) U.S. Cl.
CPC ........ *G06F 17/5072* (2013.01); *G06F 17/5077* (2013.01); *G06F 2217/76* (2013.01)

(58) Field of Classification Search
CPC .................................. G06F 17/50; G06F 9/455
USPC .................................. 716/100, 110, 118, 119
See application file for complete search history.

(56) References Cited

U.S. PATENT DOCUMENTS

| | | | |
|---|---|---|---|
| 5,712,510 A | 1/1998 | Bui et al. | |
| 6,867,056 B1 * | 3/2005 | Hau-Riege et al. | 438/17 |
| 8,595,667 B1 * | 11/2013 | Shroff et al. | 716/112 |
| 2003/0082836 A1 * | 5/2003 | Fetterman et al. | 438/14 |
| 2010/0193870 A1 * | 8/2010 | Ho et al. | 257/365 |
| 2013/0147051 A1 * | 6/2013 | Shroff et al. | 257/774 |

OTHER PUBLICATIONS

A. Heryanto et al., "Study of Stress Migration and Electromigration Interaction in Copper/Low-κ Interconnects", 2010, pp. 586-590.
E.T. Ogawa et al., "Stress-Induced Voiding Under Vias Connected to Wide Cu Metal Leads", 2002, pp. 312-321, 40th Annual International Reliability Physics Symposium.
Gavin D. R. Hall et al., "Impact of Via Interactions and Metal Slotting on Stress Induced Voiding", 46th Annual International Reliability Physics Symposium, 2008, pp. 392-398, Phoenix.
H. Matsuyama et al., "Stress Migration Phenomena in Narrow Copper Lines", 2006, pp. 28-30, IIRW Final Report.
T. Kouno et al., "Stress-Induced Voiding Under Vias Connected to "Narrow" Copper Lines", Electron Devices Meeting, 2005, 187-190.

* cited by examiner

*Primary Examiner* — Brian Ngo
(74) *Attorney, Agent, or Firm* — Lempia Summerfield Katz LLC

(57) ABSTRACT

A computer-implemented method of configuring a semiconductor device includes identifying an interconnect having an interconnect path length greater than a stress-induced void formation characteristic length of the semiconductor device, and placing, with a processor, a conductive structure adjacent the interconnect to define a pair of segments of the interconnect. Each segment has a length no greater than the stress-induced void formation characteristic length of the interconnect, and the conductive structure is selected from the group consisting of a decoy via connected to the interconnect, a floating tile disposed along the interconnect, a tab that laterally extends outward from the interconnect, and a jumper from a first metal layer in which the interconnect is disposed to a second metal layer.

20 Claims, 6 Drawing Sheets

STRESS MIGRATION MITIGATION

FIELD OF INVENTION

The present embodiments relate to semiconductor devices.

BACKGROUND

Stress migration, also referred to as stress-induced voiding or cavitation, is a post-fabrication failure mechanism for semiconductor devices. Stress migration causes voids to form in metallization interconnect lines. An open circuit may occur if enough voids accumulate in a location along the interconnect line. An accumulation of voids can also lead to degraded circuit performance through substantially higher resistances.

The voids arise from vacancies in the interconnect metallization. The vacancies form during fabrication processes, such as during deposition and electroplating. For example, an electroplated metal layer is often left with grains. Vacancies are present between the grains. Oftentimes, when the semiconductor device is tested immediately after fabrication, the vacancies remain harmlessly distributed at various positions along the conductors.

Device failures subsequently occur as the vacancies migrate and accumulate to form the voids. The vacancies migrate due to stress gradients arising from different thermal expansion coefficients between the interconnect metal and surrounding dielectric layers. The thermal expansion coefficients of the conductor materials (e.g., aluminum and copper) may be several times greater than the thermal expansion coefficients of the substrate (e.g., silicon) and dielectric materials adjacent the interconnects. The conductors thus expand and contract at a different rate than the nearby semiconductor and dielectric materials during subsequent heating and cooling cycles. The thermal cycles may occur during subsequent fabrication processes or over time as a result of use in the field.

Vias present discontinuities in the stress fields in the conductors. As a result, the vacancies tend to migrate to, and accumulate at, the vias. As more vacancies accumulate at a particular via, a void is formed. Over time, the voids can grow and lead to an open circuit or significant increase in resistance, thereby leading to via failure.

Although the failure of any one individual via may have a low probability of occurring, the likelihood of one via failure on a chip with millions of vias is undesirably high. Thus, circuits often include redundant vias, the theory being that it is sufficiently unlikely that two vias will fail on the same interconnect. However, inserting redundant vias is often complicated or prevented by a lack of space in circuit layouts.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE PRESENTLY PREFERRED EMBODIMENTS

Figure 1:
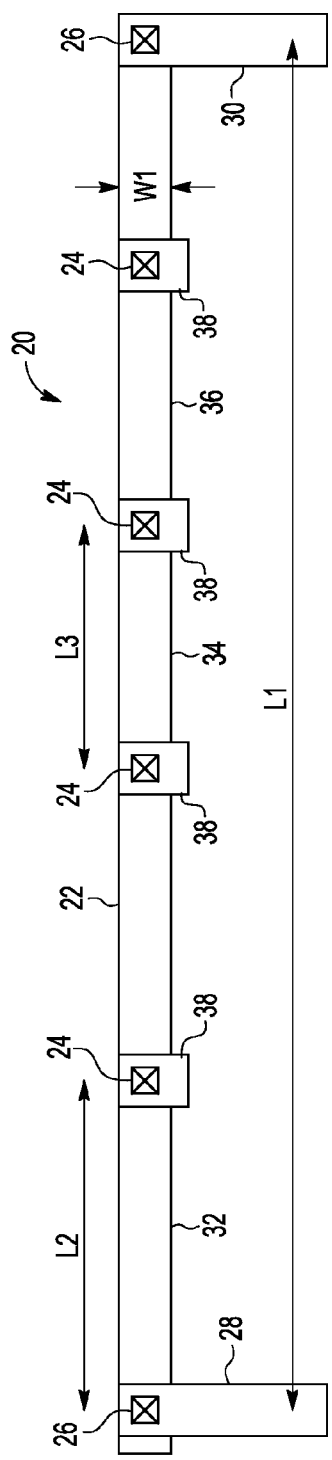
FIG. 1 is a schematic, simplified, plan view of a semiconductor device having an interconnect with a number of extraneous conductive structures configured for stress migration mitigation in accordance with one embodiment.

Semiconductor devices with structures for mitigating stress migration, and methods of fabricating such devices, are described. The structures may be extraneous conductive structures adjacent to interconnects at risk of stress-induced void (SIV) formation. As described below, the structures may be extraneous in the sense that the structures may not be directed to, or strictly necessary for achieving, the purpose of the interconnect, i.e., electrical conduction along a path between nodes of a circuit or network. The extraneous conductive structures may have different configurations, including, for example, decoy vias, jumpers, floating tiles (or dummy lines), and tabs.

While stress-induced voiding is often associated with wide conductors, the disclosed embodiments are directed to mitigating stress migration and stress-induced voiding in connection with long, narrow interconnects. Even though wider conductors may present more vacancies for accumulation, stress-induced voiding may also occur when interconnects are long and narrow. Another characteristic that may be relevant to whether stress-induced voiding occurs is the extent to which the interconnect is isolated from other conductors, i.e., disposed in an area with a low density of conductors. The disclosed embodiments are directed to preventing these conditions from existing in a semiconductor device. To that end, the disclosed embodiments add or otherwise incorporate the extraneous conductive structure(s) to an interconnect such that the interconnect no longer qualifies as long, narrow, and/or isolated. For example, jumpers may be used to selectively or effectively shorten the interconnect. Decoy vias (vias that extend from the interconnect without connecting to another circuit element) or redundant vias may be used to provide more sites for vacancy accumulation, thereby spreading the vacancies over more vias and reducing the risk of failure of functional vias. Tabs may be used to selectively increase the width of the interconnect. Floating tiles (or dummy lines) may be used to selectively decrease the line pitch of the metal layer, or increase the density of the metal layer in the proximity of the interconnect, to thereby simulate a dense line arrangement.

The extraneous conductive structures may bifurcate or otherwise partition the interconnects into segments so that one or more of the length, width, and isolation conditions for SIV formation is not applicable to a section of the interconnect. The extraneous conductive structures may thus be distributed along the interconnect, and need not be close to vias being protected thereby. The positioning of each extraneous conductive structure may define or delineate a pair of segments that do not have a length greater than an SIV formation characteristic length of the interconnect. The SIV formation characteristic length may refer to a threshold length for potentially harmful vacancy diffusion in narrow conductors. Narrow conductors shorter than the threshold length are not at risk of SIV formation from the vacancy diffusion, while those longer than the threshold length are at risk. The extraneous conductive structures may be positioned along interconnects to define segments shorter than the SIV formation characteristic length. Further details regarding the SIV formation characteristic lengths of exemplary interconnects are set forth in, for example, Kouno et al., "Stress-Induced Voiding under Vias Connected to 'Narrow" Copper Lines," IEDM Technical Digest, pp. 187-190 (2005) and Matsuyama et al. "Stress migration phenomena in narrow copper lines," Integrated Reliability Workshop Final Report, IEEE International, pp. 28-30 (2006).

Each segment may be configured as an intrinsic segment of the interconnect. The segments may be intrinsic in the sense that the segments are not altered or otherwise affected along their respective lengths by any further conductive structures to suppress or limit stress-induced voiding. The number and length of intrinsic segments may vary with the number of extraneous conductive structures are incorporated into a given interconnect.

The extraneous conductive structures may be functional or non-functional. One example of a functional structure includes a jumper or a staple that temporarily diverts the interconnect to another metal layer. While the jumper is functional, it may nonetheless be considered extraneous in the sense that the jumper is an extraneous diversion or departure from the path of the interconnect. There is no interconnect reason to divert or reroute the path of the interconnect to another metal layer. For example, the rerouting does not establish a path around an obstacle. The rerouting is instead directed to bifurcating or partitioning the interconnect into segments shorter than the SIV formation characteristic length. Other deviations from a path of the interconnect may be used to provide an extraneous conductive structure. Some deviations may be non-functional, such as those deviations that do not connect with another circuit element. For example, a tab or decoy via may extend from the interconnect without connecting to another circuit element.

The extraneous conductive structures may provide a layout-based technique or approach to mitigating the effects of stress migration. The layout-based nature of the approach may be compatible with a wide variety of semiconductor devices. Unlike process-based solutions or solutions relying on specific materials, the extraneous conductive structures of the disclosed embodiments are not limited to particular semiconductor technologies. For example, the disclosed embodiments may be used with any current or future technology using copper metallization. The disclosed devices and methods may thus be used with a variety of different semiconductor substrates. The construction of the substrates of the disclosed devices may also vary. The disclosed embodiments are also not limited to any particular transistor or other device configuration.

The disclosed embodiments may provide a circuit design method with multiple options for mitigating or preventing the problems arising from stress migration. The method may be implemented as a method of configuring a semiconductor device that provides multiple ways to avoid the presence of long, narrow, and isolated lines. Having multiple options may be useful because one or more of the options may not be available or possible at some locations due to practical constraints. For example, having multiple options may be useful in connection with narrow interconnects, inasmuch as the ability to incorporate redundant vias or other conductive structures into narrow conductors is often more difficult than with wide interconnects. If placement of a redundant via is not possible due to lack of space, then one of the other options may be pursued to prevent the conductor from qualifying as a long, narrow interconnect at risk of SIV formation. In some embodiments, the multiple options are used to provide a semiconductor device that lacks any narrow interconnects with an untreated or otherwise unaddressed segment longer than the SIV formation characteristic length.

The circuit design method may also be configured to utilize more than one of the options on a given interconnect. Various combinations of the techniques may be applied to minimize SIV formation.

The circuit design methodology may be implemented by a router or other design layout tool or other computer-implemented design tool configured to automatically add one of the types of extraneous conductive structures along the conductor when it is not possible to add redundant vias. In some embodiments, the router may add jumpers, decoy vias, floating tiles, or tabs, at intervals less than the SIV formation characteristic length. For example, one of such structures may be added every 10-25 μm on lines that otherwise would not have intermediate length vias present. The distance at which the structures are added may be a function of metal spacing. If decoy vias are used, the decoy vias may help getter vacancies throughout the line and prevent excessive void formation at functional vias. If jumpers are used, the vacancies may be distributed over a large enough number of vias so as to sufficiently limit or suppress the size or formation of voids. In alternative embodiments, a design-for-manufacturing (DFM) script or customized tiling script or other set of computer-executable instructions may be used to incorporate the extraneous conductive structures.

Although described below in connection with several copper-based metallization examples, the disclosed embodiments may be useful in connection with various metallization arrangements. For example, the disclosed embodiments may be useful in connection with metallization arrangements having various barrier materials (e.g., Ta, TaN, and TiN) and any dielectric material (e.g., tetraethyl orthosilicate (TEOS), fluorinated TEOS (FTEOS), carbon-doped oxide dielectrics (e.g., SiCOH), Black Diamond II™ (BDII) dielectric available from Applied Materials of Santa Clara, Calif., etc.). The SIV formation characteristic length may vary based on the material(s), depth, arrangement, fabrication process, barrier material(s), or other characteristic of the metallization.

Narrow conductors or interconnects are those with a width up to about three times the minimum line dimension of the semiconductor device being designed or fabricated. In some embodiments, narrow conductors or interconnects are those with a width up to about two times the minimum line dimension. The minimum line dimension may correspond with the minimum interconnect line width. Narrow conductors may thus have a width that falls anywhere between about one to about three times the minimum line dimension. Wide conductors are those with a width of about three or more times the minimum line dimension. The minimum line dimension may vary based on the technology, or technology node, used to fabricate the semiconductor device. The technology may include or involve the semiconductor materials, e.g., the substrate, the metallization materials, and other materials used in the semiconductor device. The technology may also include or involve the photolithography and other aspects of the fabrication processes. For these reasons, the minimum line dimension may vary considerably. For instance, different technology nodes may have a minimum line dimension that ranges from about 50 nm to about 210 nm, such as 70, 90, or 130 nm. Other minimum line dimensions may be used. The technology node may have other minimum dimensions, such as a minimum gate dimension.

Long conductors or interconnects are those with a length greater than the SIV formation characteristic length of the conductor or interconnect. The characteristic length may vary based on the metal layer(s) or other materials in and/or around the interconnect, the process by which the interconnect was formed, and other aspects of the interconnect that may, for instance, be determinative of the distribution of vacancies therein. In some embodiments, the characteristic length may fall in a range from about 10 µm to about 30 µm. Alternatively, the characteristic length may fall in a range from about 10 µm to about 25 µm. For example, if the characteristic length is 25 µm, then all interconnects greater than 25 µm are considered to be long interconnects and, thus, may be at risk of SIV formation depending on the width of the interconnect. In some cases, such interconnects are at risk of SIV formation depending on the degree of isolation of the interconnect.

The degree of isolation or line pitch for a given interconnect may be expressed in terms of the metallization or metal coverage of the semiconductor device within an area in proximity to the interconnect. In some embodiments, a given interconnect is considered to be isolated if the line pitch results in less than about 50% of the area is covered by metal. The area may be defined in terms of the minimum line dimension. For example, the area may be defined as the space extending laterally outward from the edges of interconnect about three times the minimum line dimension. In another embodiment, the area may be defined as a larger space, such as five times the minimum line dimension. The line pitch threshold may vary from 50% based on the area under consideration.

Although described herein in connection with interconnect lines, the disclosed embodiments are not limited to a particular interconnect configuration. The term "interconnect" is used herein in a broad sense to include any metal or metal-based conductor configured to establish an electrical connection between two nodes of an electrical circuit or network of the semiconductor device. The terms "line" and "conductor" may be used interchangeably with the term "interconnect." The materials of the interconnect may vary, and may include non-metallic materials in addition to the metal layer(s) thereof. The depth, layer stack, and other cross-sectional characteristics of the interconnects may vary.

Figure 6:
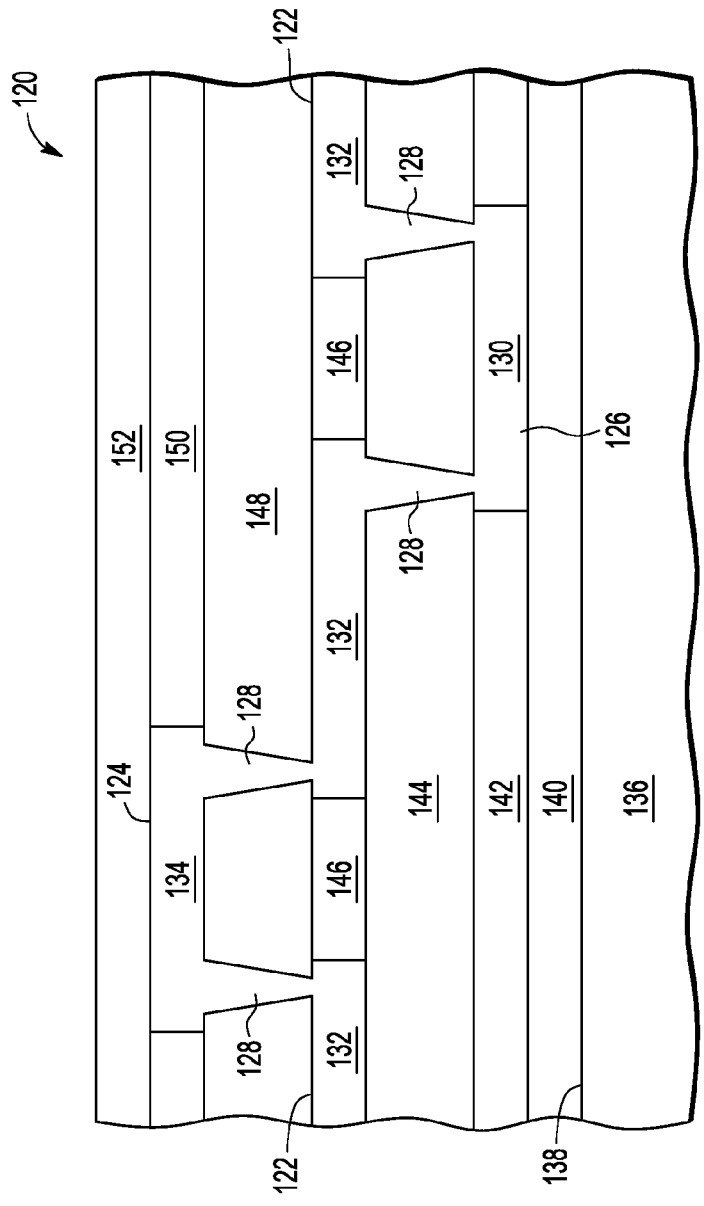
FIG. 6 is a schematic, simplified, cross-sectional view of the semiconductor device taken along lines 6-6 of FIG. 5.

FIG. 1 is a plan view of a semiconductor device 20 having an interconnect 22 supported by a substrate, such as the substrate shown in FIG. 6. The interconnect 22 is modified or configured in accordance with one of the layout-based techniques for mitigating stress migration via a number of extraneous conductive structures disposed adjacent the interconnect 22. In this embodiment, multiple decoy vias 24 are disposed at intervals along, and connected to, the interconnect 22. Each decoy via 24 is disposed between a pair of functional vias 26 that electrically connect the interconnect 22 to conductors 28, 30. Although not shown in the figure, decoy vias may also be placed between a functional via and an end of the interconnect if room is available to place the decoy via. Each conductor 28, 30 may be disposed in any other metal layer of the semiconductor device 20, including both upper or lower metal layers.

The interconnect 22 has a length L1 defined by the distance between the pair of functional vias 26. The length L1 is longer than the SIV formation characteristic length. For example, the length L1 may be longer than about 10 µm to about 25 µm. The interconnect 22 also has a width W1 less than three times a minimum line dimension of the semiconductor device. Conductors of the length L1 and the width W1 are considered long, narrow conductors and, thus, are at risk of SIV formation at each functional via 26.

The decoy vias 24 are spaced from one another and/or the functional vias 26 so that the interconnect 22 does not qualify as a long and narrow conductor. Each decoy via 24 is disposed adjacent the interconnect 22 in an area along the interconnect 22 to bifurcate or otherwise partition the interconnect 22 into segments to reduce the risk of SIV formation. In this example, one of the decoy vias 24 is spaced from one of the functional vias 26 to define a segment 32 having a length L2, which is less than the SIV formation characteristic length. The length L2 may be, for instance, less than about 10 µm or less about 25 µm. The decoy vias 24 may thus help getter vacancies present throughout the interconnect 22 and thereby prevent or limit void formation at the functional vias 26.

Another one of the decoy vias 24 defines a pair of segments 34, 36 of the interconnect 22. In this example, each segment 34, 36 may have a length L3, which is also less than the SIV formation characteristic length. The length L3 may differ from the length L2. The decoy vias 24 may be distributed non-uniformly along the interconnect 22 in some cases, such as when there is insufficient space in the upper and lower levels for placement of the decoy vias 24 at uniform intervals. The segments 34, 36 may have different lengths in an alternative embodiment.

In the embodiment of FIG. 1, each of the segments 32, 34, 36 is configured as an intrinsic segment of the interconnect 22. Each segment 32, 34, 36 may be configured as an untreated, unaltered or otherwise unmodified section of the interconnect 22. To the extent that vacancies are present in one of the segments 32, 34, 36, the migration or diffusion of such vacancies is not suppressed along the length of the segment. Each segment 32, 34, 36 is free of any contiguous or noncontiguous conductive structures configured to deter, limit, or otherwise suppress vacancy diffusion in the interconnect 22. For instance, each segment 32, 34, 36 does not include or introduce an extraneous conductive structure of another layout-based technique for suppressing SIV formation. Each segment 32, 34, 36 also does not include or introduce any non-layout-based technique for suppressing SIV formation.

In an alternative embodiment, one or more of the segments 32, 34, 36 may include one or more further extraneous conductive structures or other techniques for suppressing or mitigating SIV formation. Any one or more of the other layout-based mitigation techniques may be used. The further extraneous conductive structure(s) may be configured as a contiguous and/or intrinsic conductive structure of the interconnect 22. For example, the segment 32 may include a widening tab, further details of which are set forth below. Alternatively or additionally, the further extraneous conductive structure(s) may be configured as a noncontiguous and/or extrinsic conductive structure, such as a floating tile as described below.

Any number of decoy vias 24 may be used to bifurcate or partition the interconnect 22 into segments no greater than the SIV formation characteristic length. Each decoy via 24 is a non-functional via and, thus, an extraneous conductive structure, in the sense that the decoy via 24 does not serve an interconnect function. The decoy vias 24 do not electrically couple the interconnect 22 to another circuit element of the semiconductor device 20. The term "decoy" is used herein to distinguish the decoy vias 24 from redundant and other functional vias. Each decoy via 24 is a non-functional via because the decoy via 24 couples the interconnect 22 to a respective small island 38 or other piece of metal in another layer. Each small island 38 is not otherwise connected to an active element of a circuit or network of the semiconductor device 20. Each small island 38 may thus be considered to be floating but for the connection to the interconnect 22 through the decoy via 24. The shape, size, and other characteristics of the small islands 38 may vary. The metal layer forming the small islands 38 may be either above, below, or both above and below the interconnect 22.

The term "decoy" is used herein to also distinguish other types of non-functional vias, such as dummy vias. The decoy vias 24 differ from dummy vias because one end of each decoy via 24 is connected to an active circuit component, namely the interconnect 22. In contrast, the ends of dummy vias are connected to upper and lower metal that is not connected to a circuit or network of the semiconductor device.

The interconnect 22, the vias 24, 26, the conductors 28, 30, the islands 38, and other metallization may be formed with electroplated copper (Cu) layers. The metallization may be formed via damascene processes. In one embodiment, the vias 24, 26 are formed with another metal layer, such as the conductors 28, 30, through a dual damascene process. The interconnect 22 and other metal structures may be formed by other metallization processes in other embodiments. The metallization may include alternative or additional metals. For example, the metallization may include one or more transition or barrier layers. In some cases, the metallization includes a Ta or Ta-based barrier layer.

Figure 2:
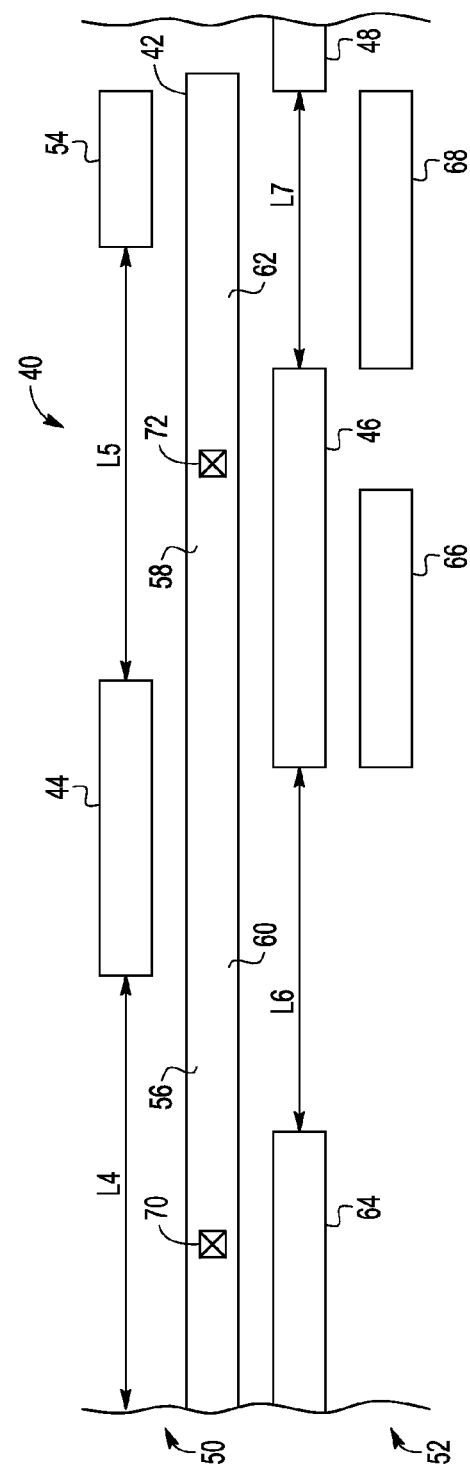
FIG. 2 is a schematic, simplified, plan view of another semiconductor device having an interconnect with a number of extraneous conductive structures configured for stress migration mitigation in accordance with one embodiment.

FIG. 2 is a plan view of a semiconductor device 40 having an interconnect 42 with another type of extraneous conductive structure configured to mitigate stress migration. In this embodiment, the extraneous conductive structure is a floating tile or dummy line to decrease the line pitch for the interconnect 42. The interconnect 42 may be similarly configured to the interconnect 22 of FIG. 1. For example, the interconnect 42 has a width less than three times a minimum line dimension of the semiconductor device 40. The interconnect 42 may thus be at risk of SIV formation if other conditions for vacancy diffusion and accumulation are present. The other conditions may involve the length of the interconnect 42 and the metal density near the interconnect 42, i.e., the extent to which the interconnect 42 is isolated from other metal structures. In this embodiment, a number of dummy lines 44, 46, 48 are placed adjacent to the interconnect 42 in areas along the interconnect 42 to simulate a dense line configuration at intervals shorter than the SIV formation characteristic length.

Each dummy line 44, 46, 48 is placed along the length of the interconnect 42 to prevent various sections of the interconnect 42 from being sparse or isolated. The dummy lines 44, 46, 48 increase the metal coverage density in areas 50, 52 near the interconnect 42. The areas 50, 52 in question may correspond with the space on each lateral side of the interconnect 42. Each area 50, 52 in question may extend outward from both sides of the interconnect 42 about three to about five times the minimum line dimension of the interconnect 42. A dummy line (or other floating tile) may be added along the length of the interconnect 42 at each position such that, without the dummy line, the area 50 or the area 52 would have a metal coverage density less than 50% for a length greater than the SIV formation characteristic length. In the example shown in FIG. 2, the dummy line 44 is disposed in the area 50 because there are no conductive structures other than a conductor 54. The positioning and length of the dummy line 44 may be configured such that segments 56 and 58 of the interconnect 42 over lengths L4 and L5, respectively, are less than the SIV formation characteristic length. In the area 52, the dummy lines 46 and 48 are added, positioned, and configured such that segments 60 and 62 of the interconnect 42 over lengths L6 and L7, respectively, are less than the SIV formation characteristic length.

In this example, the presence of a conductor 64 in the area 52 may alone establish a metal coverage density of 50% or greater as measured in the area in proximity to the interconnect, such that another dummy line is not necessary in that area. In contrast, conductors 66 and 68 may be too remote from the interconnect 42 to avoid isolation of the interconnect 42. For example, the conductors 66 and 68 may be spaced from the interconnect 42 by a distance greater than about three to about five times the minimum line dimension. The presence of the conductors 66 and 68 may accordingly not be considered in the metal coverage density calculation.

Each dummy line 44, 46, 48 is floating. Unlike the previous embodiment, the dummy lines 44, 46, 48 are not contiguous with, or connected to, the interconnect 42. As a dummy element, each dummy line 44, 46, 48 is also not connected to any other active circuit element of the semiconductor device 40. Despite being spaced from the interconnect 42, the dummy lines 44, 46, 48 effectively bifurcate or otherwise partition the interconnect 42 into segments, each having a length no greater than the SIV formation characteristic length of the interconnect 42.

In the embodiment of FIG. 2, the interconnect 42 includes functional vias 70, 72. The positioning of the dummy lines 44, 46, 48 may vary relative to the location of the functional vias 70, 72. For example, the dummy line 44 is not aligned or laterally overlapping either one of the functional vias 70, 72. In contrast, the dummy line 46 is aligned with or laterally overlaps the functional via 72. This distinction leads to differences in the interconnect segments defined by the dummy lines 44, 46, 48. In this example, the segments 56 and 58 include a respective one of the functional vias 70, 72 and, thus, are not intrinsic segments of the interconnect 42. In contrast, the segments 60 and 62 lack any vias and, thus, are intrinsic segments free of any contiguous or noncontiguous conductive structures configured to suppress vacancy diffusion in the interconnect 42. Other functional vias that may be susceptible to SIV formation may benefit from dummy lines even if the dummy lines are not in close proximity to the functional vias being protected.

A sufficiently high density of the metal layer in the area in which the interconnect 42 is disposed may decrease the likelihood or extent of stress migration. The increased density may provide better thermal conduction in the proximity of the interconnect 42. Heat may be better conducted away from the interconnect 42, thereby reducing vacancy diffusion. In this example, the width of the area in question is about five times the minimum line dimension of the interconnect. Given that area, a metal coverage density within this area that is sufficient to mitigate stress migration is about 50%. In an alternative embodiment having a smaller or larger defined area, the metal coverage density threshold may be lower or higher, respectively.

The shapes, dimensions, and other characteristics of the dummy lines or other tiles may vary from the example shown. Other tile shapes, such as squares or other non-elongated tiles, may be used. The characteristics may vary among the dummy lines or tiles disposed along a given interconnect. For example, the dummy line 44 may be wider or shaped differently than the dummy line 46, which may be possible due to an increased amount of space on one side of the interconnect 42.

Figure 3:
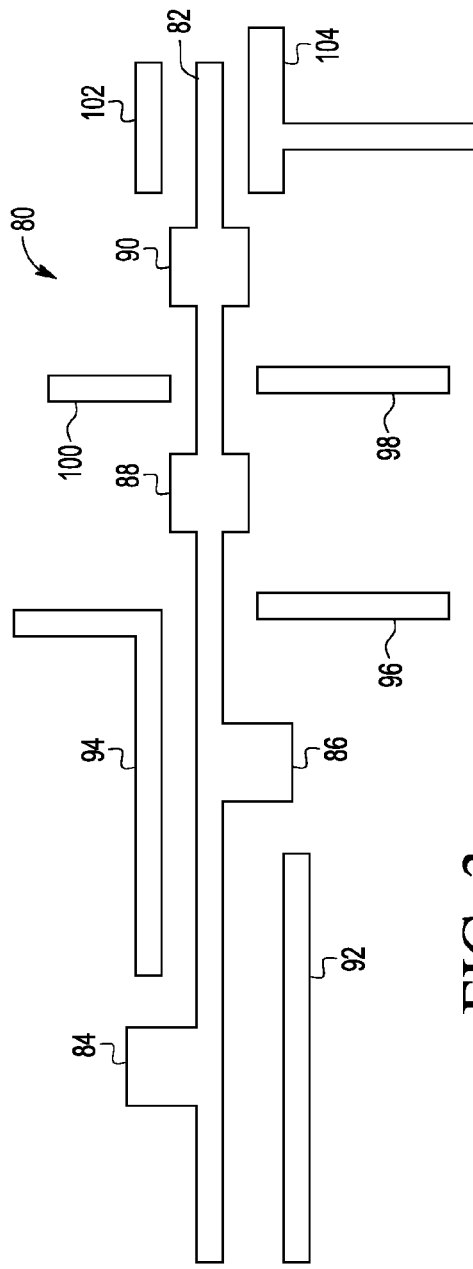
FIG. 3 is a schematic, simplified, plan view of yet another semiconductor device having an interconnect with a number of extraneous conductive structures configured for stress migration mitigation in accordance with one embodiment.

FIG. 3 is a plan view of a semiconductor device 80 that utilizes another layout-based technique for mitigating stress migration. The semiconductor device 80 includes an interconnect 82 that may be configured as one or more of the interconnects described above. For example, the interconnect 82 may primarily be narrow over most of its length. In some embodiments, the interconnect 82 has a width less than or equal to about two times the minimum line dimension of the semiconductor device 80. The width of the interconnect 82 is addressed in this embodiment. The width of the interconnect 82 is selectively increased by extraneous conductive structures for stress migration mitigation. For example, the width may be occasionally or selectively increased to about three times the minimum line dimension. The extraneous conductive structures include widening tabs 84, 86, 88, 90 adjacent the interconnect 82. The widening tabs are extraneous because the presence of the tabs is not necessary for achieving conduction along the path of the interconnect 82. Each tab 84, 86, 88, 90 is contiguous with, and connected to, the interconnect 82. The widening tabs provide a mitigation technique in circumstances, in which, for example, it is not possible to widen the interconnect 82 over its entire length due to, for example, other lines in its proximity. The selective widening may disrupt the vacancy diffusion path in the interconnect 82, such as along a grain boundary thereof.

Each tab 84, 86, 88, 90 extends laterally outward from the interconnect 82 to selectively widen the interconnect 82 at the respective tab. The interconnect 82 no longer qualifies as a narrow conductor where widened by one of the tabs. Each tab 84, 86, 88, 90 may be positioned along the interconnect 82 to define segments of the interconnect 82 that have lengths no greater than the SIV formation characteristic length of the interconnect 82, as described above. As a result, the non-widened segments or sections of the interconnect 82 are not long enough to qualify as a long conductor. The tabs 84, 86, 88, 90 may thus prevent any section of the interconnect 82 from qualifying as a narrow, long conductor at risk of SIV formation.

The tabs 84, 86, 88, 90 may be added at intervals to selectively increase the width of the conductor. The intervals may fall in a range that corresponds with the SIV formation characteristic length, e.g., from about 10 μm to about 25 μm. The intervals may be uniform or non-uniform intervals. The tabs may be added at or near a functional via, or distal from a functional via.

The widening may be symmetric or asymmetric based on the available space along the interconnect 82. The lateral positioning of the tabs 84, 86, 88, 90 relative to the primary axis of the interconnect 82 may vary based on the space available on either side of the interconnect 82. For example, the tabs 84 and 86 laterally extend from the interconnect 82 in a single direction because of the presence of a conductor 92 or 94 on the other side. In contrast, the tabs 88 and 90 may straddle the interconnect 82 to laterally extend from the interconnect 82 in both directions due to the absence of any conductors on either side. In each case, the tabs 88 and 90 are axially spaced from conductors 96, 98, 100, 102 and 104 in the vicinity of the interconnect 82, each of which may be an active conductor of the semiconductor device 80. Each of the conductors 92, 94, 96, 98, 100, 102, 104 may be interconnects and, as a result, are not extraneous conductive structures because each conductor provides an interconnect function, albeit for a different network or circuit of the semiconductor device 80.

The interconnect segments defined by the tabs may be intrinsic segments, as described above. For example, the interconnect segments may be lacking functional or non-functional vias or other structures configured to suppress vacancy diffusion in the interconnect 82. However, in the example shown, one or more of the above-referenced conductors may be sufficiently close to the interconnect 82 to suppress vacancy diffusion in the segments by increasing the metal coverage density near the interconnect 82. For example, the proximity of the conductors 92, 94, 102, and 104 to the interconnect 82 may help suppress vacancy diffusion in the sections of the interconnect 82 to which the conductors 92, 94 are adjacent. In such cases, the distance between certain tabs may exceed the SIV formation characteristic length. For example, the distance between the tabs 84 and 86 may exceed the characteristic length because vacancy diffusion in that interconnect segment is mitigated through metal coverage density. The interconnect 82 is shown for ease in illustration without functional vias at its ends.

The tabs 84, 86, 88, 90 may be sized to avoid effectively transforming the interconnect 82 into a wide conductor. Wide conductors may be at risk of enhancing SIV formation by increasing the overall presence of vacancies. The width of interconnect 82 at the tabs 84, 86, 88, 90 may be limited to about three times the minimum line dimension of the semiconductor device 80.

Figure 4:
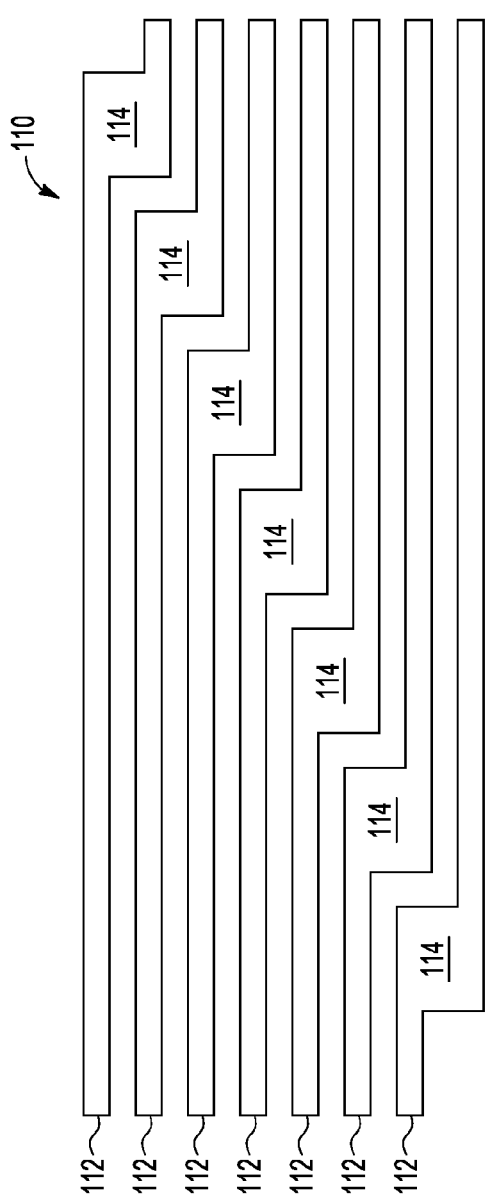
FIG. 4 is a schematic, simplified, plan view of a semiconductor device having a set of interconnects with respective extraneous conductive structures configured for stress migration mitigation in accordance with one embodiment.

FIG. 4 is a plan view of another embodiment in which widening tabs are used as extraneous conductive structures to mitigate stress migration. In this embodiment, a semiconductor device 110 includes a set of interconnects 112 disposed in a parallel arrangement. The arrangement may include one or more areas in which segments of the interconnects 112 are running alongside one another in parallel. In this example, segments of the interconnects 112 are disposed in parallel on either side of widening tabs 114. Each tab 114 is connected to a respective one of the interconnects 112. Each interconnect 112 may be otherwise configured similarly to the interconnects described above. The interconnects 112 are also shown for ease in illustration without functional vias at respective ends thereof.

The tabs 114 are disposed in an axially staggered arrangement along the set of interconnects 112. Each tab 114 is axially staggered or offset from the tabs 114 in adjacent interconnects 112 to minimize the area penalty introduced by the selective widening of the interconnects 112. Staggering the tabs 114 allows the total increase in width for the set of interconnects to be limited to the size of a single tab, regardless of the number of interconnects 112 in the set.

The lateral spacing of the interconnects 112 may also address whether any one of the interconnects 112 qualifies as a conductor at risk of SIV formation due to isolation. The proximity of the interconnects 112 to one another may increase the metal coverage density to an extent that suppresses vacancy diffusion. Alternatively or additionally, the proximity of the tabs 114 to one another may also suppress vacancy diffusion.

Figure 5:
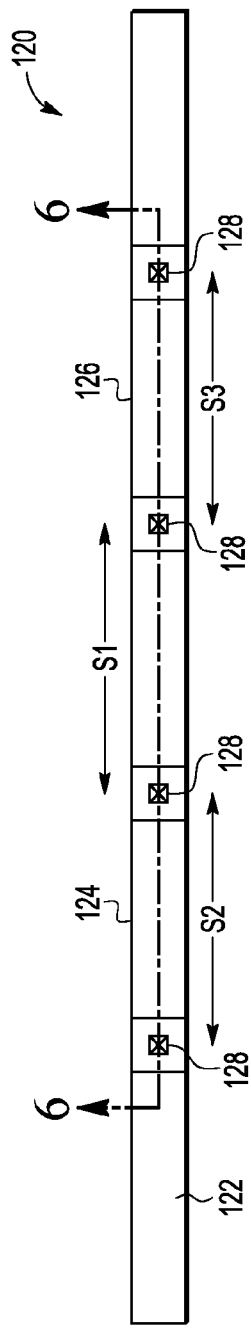
FIG. 5 is a schematic, simplified, plan view of yet another semiconductor device having an interconnect with a number of extraneous conductive structures configured for stress migration mitigation in accordance with one embodiment.

FIGS. 5 and 6 are plan and cross-sectional views, respectively, of another semiconductor device 120 in which SIV formation is suppressed in an interconnect 122 through jumpers or staples 124, 126 from a metal layer in which the interconnect 122 is disposed to another metal layer. The interconnect 122 may be otherwise configured similarly to the interconnects described above. Each jumper 124 introduces a pair of vias 128 electrically connected to, and contiguous with, the interconnect 122 at respective positions along the interconnect 122. The presence of the vias 128 partitions the interconnect 122 into segments having a length no greater than the SIV formation characteristic length to mitigate SIV formation. The additional vias 128 may also limit the number of vacancies that accumulate at any one functional via along the interconnect 122. With the vacancies distributed to more vias, the risk of SIV formation is further mitigated. Each interconnect, jumper, or other metal layer may include a barrier layer, which may be useful for preventing copper migration into an adjacent dielectric layer. The barrier layers are not shown for ease in illustration.

To limit the number of vacancies accumulating at a given via, the jumpers 124, 126 may be spaced from one another (and any other vias) by a distance shorter than the SIV formation characteristic length of the interconnect 122. In this example, a spacing S1 (FIG. 5) may have a length less than about 10 μm to about 25 μm. The vias 128 of one of the jumpers 124, 126 may also be spaced from one another (and any other vias) by a distance shorter than the SIV formation characteristic length of the interconnect 122. In this example, spacing S2 and S3 (FIG. 5) may have a length less than about 10 μm to about 25 μm. The lengths of the spacings S1, S2, S3 may differ from one another. For example, the length of the jumpers 124, 126 may vary based on the extent to which area is available in the upper or lower metal layer. The lengths of the jumpers 124, 126 may also be longer than a maximum length for addressing the Blech effect in electromigration.

The jumpers 124, 126 may go to an upper or lower metal layer. In this example, the jumpers 124, 126 go to the layers immediately above and immediately below the metal layer in which the interconnect 122 is disposed. As shown in the cross-sectional view of FIG. 6, the semiconductor device 120 includes a first (or lower) metal layer (M1) 130, a second (or intermediate) metal layer (M2) 132, and a third (or upper) metal layer (M3) 134. In this example, the interconnect 122 is disposed in the intermediate metal layer 132, and the jumpers 124, 126 are disposed in the upper and lower metal layers 134 and 130, respectively. Each metal layer 130, 132, 134 is supported by a substrate 136 in which a number of transistor and/or other device structures are formed in one or more active layers. In this example, a surface 138 of the substrate 128 is passivated by a dielectric layer 140. A number of contacts (not shown) are disposed in holes in the dielectric layer 140 to electrically couple the device structures with the lower metal layer 130. Another dielectric layer 142 may be disposed on or above the dielectric layer 140 and patterned to define the jumper 126 in the lower metal layer 130. An interlayer dielectric (ILD) layer 144 is disposed on or above the dielectric layer 142 and the lower metal layer 130, and patterned to define the vias 128 of the jumper 126. A dielectric layer 146 is disposed on or above the ILD layer 144 and patterned to define the interconnect 122 in the intermediate metal layer 132. The patterning of the dielectric layer 146 and definition of the interconnect 122 leaves gaps in the intermediate metal layer 132 at each jumper location. Another ILD layer 148 is disposed on or above the dielectric layer 146 and the intermediate metal layer 132, and patterned to define the vias 128 of the jumper 124. Another dielectric layer 150 may be disposed on or above the ILD layer 148, and patterned to define the jumper 124 in the upper metal layer 134. A dielectric layer 152 may be disposed on or above the upper metal layer 134 and the dielectric layer 150 to passivate the semiconductor device 120. Fewer or additional metal layers may be used. For example, the jumpers 124, 126 may go to the same metal layer. Notwithstanding the foregoing, the patterning and metallization of a metal layer and vias below the metal layer may be implemented together in accordance with a dual damascene process.

Each jumper 124, 126 is an extraneous conductive structure for the interconnect 122 despite being an intrinsic component of the interconnect 122. Neither jumper 124, 126 is electrically connected to a circuit element of the semiconductor device 120 other than the interconnect 122. Neither jumper 124, 126 is relied upon by the interconnect 122 to bypass a conductive structure in the intermediate metal layer 132 in which the interconnect 122 is disposed. The intermediate metal layer 132 is free of a conductive structure that the jumper 124 or 126 would bypass. As shown in FIG. 6, there is no conductive structure in the intermediate metal layer 132 at the locations of the jumpers 124, 126 that would block or prevent the interconnect 122 from continuing along its path. Each jumper 124, 126 is thus not provided or needed as a bypass, as nothing in the semiconductor device 120 would interfere with the continuation of the interconnect 122 in the intermediate metal layer 132 at the locations of the jumpers 124, 126. With the jumpers 124, 126 not bypassing anything, the diversions to another metal layer introduced by the jumpers 124, 126 may be considered to be unnecessary for basic functioning of the circuit and, thus, extraneous structures for the interconnect 122.

In the example of FIGS. 5 and 6, each segment of the interconnect 122 defined by the jumpers 124, 126 is configured as an intrinsic segment of the interconnect 122. Each segment is free of any other contiguous or noncontiguous conductive structures configured to suppress vacancy diffusion in the interconnect 122. In an alternative embodiment, one or more other extraneous conductive structures may be incorporated into the semiconductor device 120 along the segment(s) of the interconnect to further suppress vacancy diffusion. For example, space permitting, one or more segments of the interconnect 122 may be modified by widening tabs, by floating tiles, and/or by decoy vias, as described above.

Figure 7:
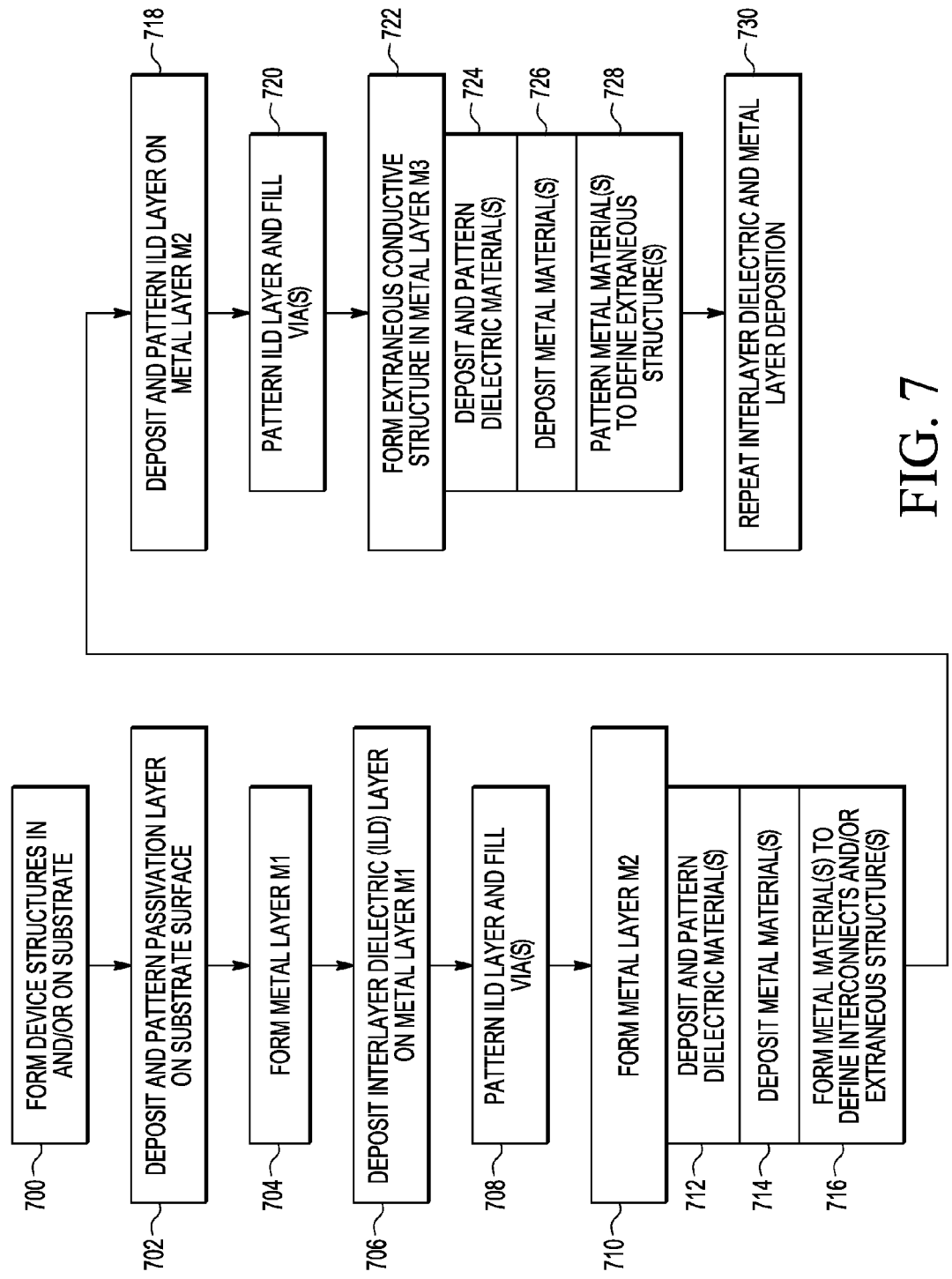
FIG. 7 is a flow diagram of an exemplary method of fabricating a semiconductor device having an interconnect configured for stress migration mitigation in accordance with one embodiment.

FIG. 7 depicts a method of fabricating a semiconductor device, such as the semiconductor devices described above. The semiconductor device may utilize one or more of the above-described techniques for mitigating stress migration in an interconnect of the semiconductor device. For example, the semiconductor device may include a number of jumpers (and/or other vias) and be otherwise configured as shown in the cross-section of FIG. 6. The method includes a sequence of acts or steps, only the salient of which are depicted for convenience in illustration. Additional, fewer, or alternative steps may be implemented. For example, additional metal layers may be deposited.

The method includes the deposition of various dielectric and metal materials. As described above, the disclosed embodiments are not limited to any particular dielectric or metal material. The disclosed embodiments rely on layout-based techniques to mitigate stress migration, and thus are compatible with a wide variety of dielectric and metal materials.

The method may begin with, or include, an act 700 in which device structures are formed in a substrate. The device structures may be configured to define a number of transistor or other devices formed in and/or supported by the substrate. The substrate may include a semiconductor substrate. A variety of semiconductor materials may be used, including elementary semiconductors, such as Si, and compound semiconductors, such as GaAs. Other compound and non-compound semiconductor materials may be used. The substrate may be a lightly or heavily doped p-type or n-type substrate.

Alternatively or additionally, the substrate includes non-semiconductor materials. For example, the substrate may be configured as a semiconductor-on-insulator (SOI) substrate. The substrate may be a bulk semiconductor wafer. Other types of semiconductor substrates may be used. In some cases, the substrate is a composite substrate with any number of layers (e.g., epitaxial layers). For example, the substrate may include an original p-type semiconductor substrate on which the insulator, epitaxial, or other layers are grown or otherwise formed.

A passivation layer may be deposited over the substrate in an act 702. The passivation layer may be deposited on the surface of the substrate. The passivation layer may include any one or more dielectric materials. The act 702 may include patterning of the passivation layer to form openings for, e.g., contacts and/or other structures supported by the substrate. Alternatively or additionally, one or more active layers are deposited and formed on the surface of the substrate. The active layers may include a variety of different materials and structures supported by the substrate.

In act 704, a first metal layer M1 is formed. The formation of the metal layer M1 may include the deposition and patterning of dielectric materials, the deposition (e.g., electroplating) of metal materials, and the patterning of the metal materials via, e.g., a planarization process. The metal materials may be patterned in accordance with the patterned dielectric materials via a planarizing damascene process, such as a chemical-mechanical planarization (CMP) process. The metal layer M1 may be patterned to include a jumper or other extraneous conductive structure as described above, such as a small island of a decoy via.

An interlayer dielectric (ILD) layer may then be deposited over the substrate in an act 706. The ILD layer may be deposited on the metal layer M1. In this example, the ILD layer is then patterned to form holes for vias in an act 708. In some cases, the act 708 also includes filling the via holes with a metal or other conductive material.

In act 710, an interconnect is formed. In this example, the interconnect is defined in connection with the formation of a second metal layer M2. The interconnect has a width less than three times a minimum line dimension of the semiconductor device, as described above. The formation of the interconnect thus includes or involves establishing one or more extraneous conductive structures to mitigate stress migration in the interconnect. In the example of FIG. 7, forming the interconnect includes depositing and patterning one or more dielectric materials in an act 712, depositing one or more metal materials in an act 714, and patterning the metal material(s) in an act 716 to define and/or establish the interconnect and/or the extraneous conductive structure(s). The patterning of the metal material(s) may include a planarizing damascene process, such as a CMP process. In an alternative embodiment, the definition of the interconnect and/or extraneous conductive structure(s) may be implemented concurrently with the filling of vias in a dual damascene process. As described above, the extraneous conductive structure adjacent the interconnect defines a pair of segments of the interconnect, each segment having a length no greater than the SIV formation characteristic length of the interconnect.

The patterning of the metal layer M2 may define or establish the extraneous conductive structure in different ways. The way may depend on the type of extraneous conductive structure. In some cases, the patterning of the metal layer M2 also defines the extraneous conductive structure in the metal layer M2. For example, the extraneous conductive structure may be configured as a floating tile in the metal layer M2 or a widened tab in the metal layer M2, as described above. In other cases, establishing the extraneous conductive structure may involve or include preparing or otherwise configuring the interconnect for the presence of the extraneous conductive structure. Some or all of the extraneous conductive structure may not be formed until a later process step or act. For example, the patterning of the metal layer M2 may establish one or more gaps in the interconnect that are later bridged by a jumper formed in another metal layer, as described above. In embodiments having a decoy via as the extraneous conductive structure, the decoy via may be established once an electrical connection is made between the interconnect and a decoy via formed in the act 708, e.g., a downward via going to the metal layer M1. With a downward decoy via, the via may be formed as part of the dual damascene patterning at the current metal layer M2. In embodiments having an upward decoy via going to an upper metal layer, establishing the extraneous conductive structure may include establishing the position of the upward decoy via during the interconnect patterning as a result of the presence (and/or absence) of functional vias and/or other structures disposed along the interconnect. Given the positions of those other structures, the decoy via positions may be established to properly define the segments in accordance with the SIV formation characteristic length, as described above. Such upward decoy via(s) may thus be established in connection with the patterning of the interconnect metal layer despite being subsequently formed.

In the embodiment of FIG. 7, the method continues in an act 718 in which another ILD layer is deposited on the interconnect. The ILD layer is then patterned in an act 720 to define a pair of via openings in the ILD layer. Each via opening may be positioned at a respective one of the segments of the interconnect, as shown in FIG. 6, such that a via fill process forms a pair of vias configured to establish electrical connections between the interconnect and a jumper disposed on the ILD layer.

The remainder of the jumper may then be formed in a third metal layer M3 in an act 722. The formation of the jumper may include the deposition and patterning of one or more dielectric materials in an act 724, the deposition of one or more metal materials in an act 726, and the patterning of the metal layer in an act 728 to define the jumper on the ILD layer and electrically connect the pair of vias. The metal layer may be patterned via a planarizing damascene process. Alternatively, the formation of the vias and the jumper may be implemented collectively in a dual damascene process. Other metallization processes may be used.

The deposition and patterning of ILD and metal layers may then be repeated as shown in an act 730. Each such metal layer may include interconnects configured with one or more extraneous conductive structures as described herein.

Figure 8:
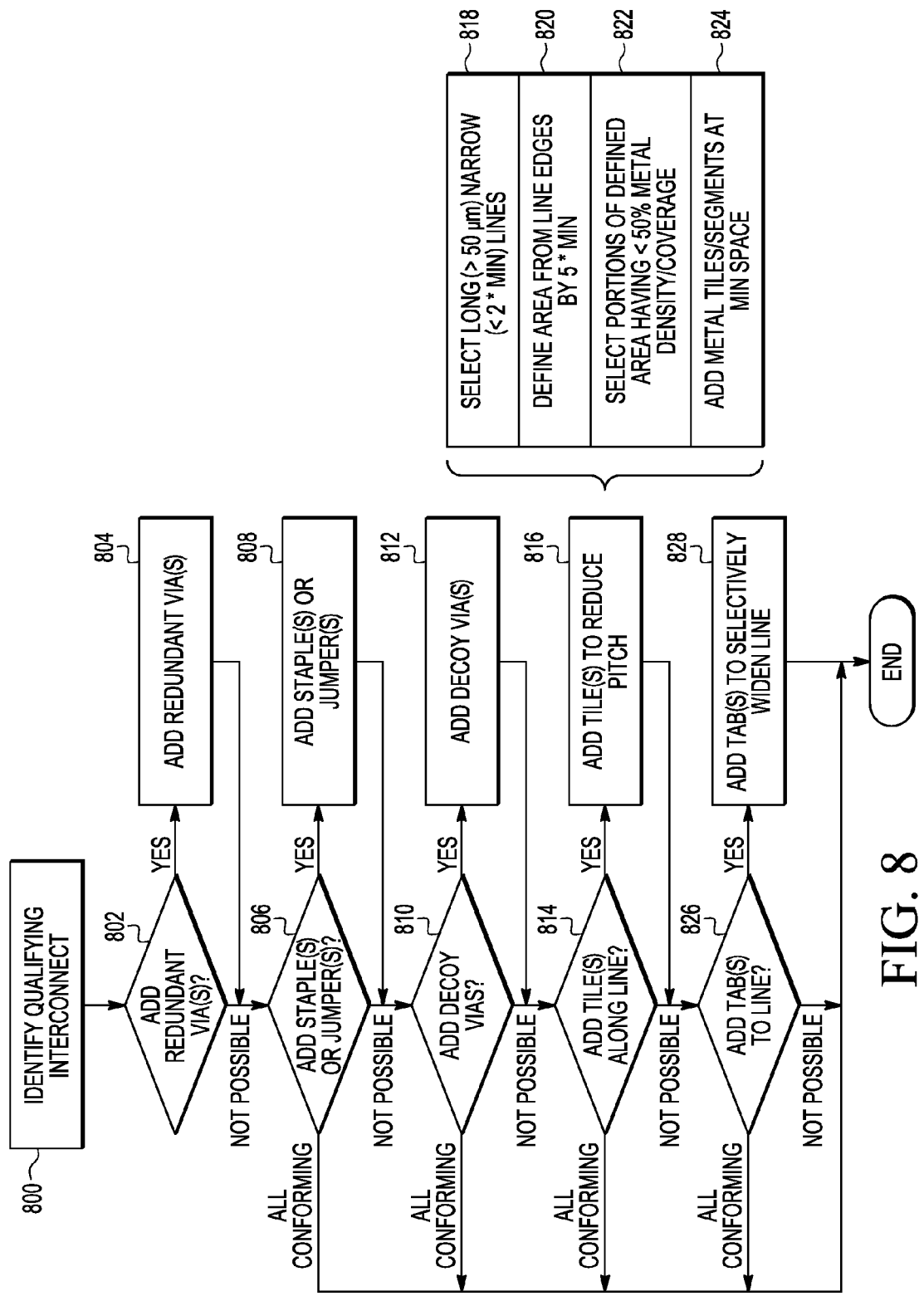
FIG. 8 is a flow diagram of a method of configuring a semiconductor device having an interconnect in accordance with one embodiment.

FIG. 8 depicts a method of configuring a semiconductor device. The method may be configured in accordance with a design methodology that incorporates one or more of the extraneous conductive structures of the embodiments described above to mitigate stress migration in the interconnects of the semiconductor device. For example, the methodology may be implemented as a set of design rules of a design for manufacturing (DFM) methodology. The method may be computer-implemented. For example, the method may be implemented by a computer-implemented router. The router may include a computer-readable storage medium in which instructions are stored to configure a processor of the router to implement the method. For example, the method may be implemented via a DFM script or customized tiling script. The method includes a sequence of acts or steps, only the salient of which are depicted for convenience in illustration. Additional, fewer, or alternative steps may be implemented.

For example, the method may form a part of a broader method of configuring the metal layers of the semiconductor device.

The method may begin in an act 800 in which a qualifying interconnect is identified. A qualifying interconnect may have a width less than three times a minimum line dimension of the semiconductor device, as well as an interconnect path length greater than the SIV formation characteristic length of the semiconductor device. In this embodiment, a decision block 802 then determines whether it is possible to add redundant vias to the interconnect. The redundant vias may be added near other functional vias, e.g., at the ends of the interconnect. Alternatively or additionally, the redundant vias may be added to bifurcate or otherwise partition the interconnect path length into segments shorter than the SIV formation characteristic length. In either case, the determination may be based on whether there is space available for the redundant via(s). If there is via space available, control passes to an act 804 in which the redundant via(s) are added. Redundant vias may be placed at the functional via locations in close proximity to each other to allow the distribution of vacancies. The number of vias and the spacing requirements may be a function of the technology node and connecting line lengths. The placement rules may specify placing a certain number of vias at a spacing less than a first predetermined value. If that is not possible given layout constraints, the placement rules may specify placing a larger number of vias at a second predetermined spacing greater than the first predetermined value. In some cases, there may be space to effectively treat some sections of the interconnect, while insufficient space exists in other sections. In such cases, the interconnect may be modified by a combination of redundant vias and one or more extraneous conductive structures. For example, stress migration may be mitigated in an interconnect by incorporating a combination of redundant vias and decoy vias.

If there is not sufficient via space available, control passes to a series of decision blocks that determine whether extraneous conductive structures may instead be added to mitigate the stress migration issue in the qualifying interconnect or nonconforming segments thereof. There may be sufficient space for one or more of such structures, even though space was not available for a redundant via. Each such decision block may be configured to determine whether space is available to add the extraneous conductive structure adjacent the interconnect at a position along the interconnect to define a pair of segments of the interconnect having respective lengths no greater than the SIV formation characteristic length. In this example, each decision block is also configured to determine whether the interconnect in question now conforms with the design rule regarding SIV formation characteristic length. If so, the method may terminate. In an alternative embodiment, the decision blocks may nevertheless attempt to incorporate additional extraneous conductive structures to, for instance, further reduce the risk of SIV formation.

A decision block may be provided for each type of extraneous conductive structure. The order in which the various types of extraneous conductive structures are analyzed for incorporation may vary. In the embodiment of FIG. 8, the method first determines whether to incorporate staples or jumpers to another metal layer in a decision block 806. If the segments of the interconnect are conforming, i.e., have respective lengths no greater than the SIV formation characteristic length, then the method terminates. If not, and space for staple or jumper is available, then control passes to an act 808 in which the structure(s) are added. It may be easier to find space for a jumper than a redundant via, insofar as the jumper is not limited to a particular metal layer.

If there is insufficient space for a jumper, then a decision block 810 determines whether space exists for one or more decoy vias. It may be easier to find space for a decoy via than a jumper due to the small size of the island in the other metal layer. If space is available, control passes to an act 812 in which the decoy via(s) are added.

Next, a decision block 814 determines whether to add one or more floating tiles along the interconnect. If at least one interconnect segment remains non-conforming, and there is an appropriately positioned space alongside the interconnect to increase the metal coverage density, then control passes to an act 816 to add one or more tiles or dummy lines to reduce the pitch or spacing between adjacent metal segments near the interconnect, as described above.

The embodiment of FIG. 8 provides an exemplary procedure for determining whether to incorporate the tiles or dummy lines. In act 818, each non-conforming interconnect is selected. In this example, a non-conforming interconnect is longer than 25 μm and has a width lower than two times the minimum line dimension. With each such interconnect, an area in proximity to the interconnect is defined in an act 820. In this example, the area extends laterally outward from the edges of the interconnect by five times the minimum line dimension. Then, in an act 822, those portions of the defined area having less than 50% metal coverage are selected. Metal lines or tiles are then added in each selected area in an act 824. In this example, each line or tile is positioned at a minimum spacing from the interconnect.

If at least one qualifying interconnect remains, control passes to a decision block 826 that determines whether to selectively widen the interconnect by adding one or more tabs. If space is available along the interconnect, then control passes to an act 828 in which the tabs are added.

In some embodiments, the method may then terminate, even if one or more qualifying interconnects remain unaddressed due to lack of available space for any of the extraneous conductive structures. In DFM embodiments, the method may nonetheless be considered to have successfully mitigated the risk of stress migration to the greatest practical extent. With multiple options for mitigation, the compliance rate with the SIV formation characteristic length may be sufficiently high to achieve satisfactory yields.

In other embodiments, the method may proceed to place one or more of the extraneous conductive structures into the semiconductor device without determining whether the other types of structures are possible. For example, after identifying a qualifying interconnect, a decoy via, a floating tile, a widening tab, or a jumper may be placed adjacent the interconnect as described above. The method may then proceed to place additional structures of the same type and/or a different type, as desired or warranted.

Figure 9:
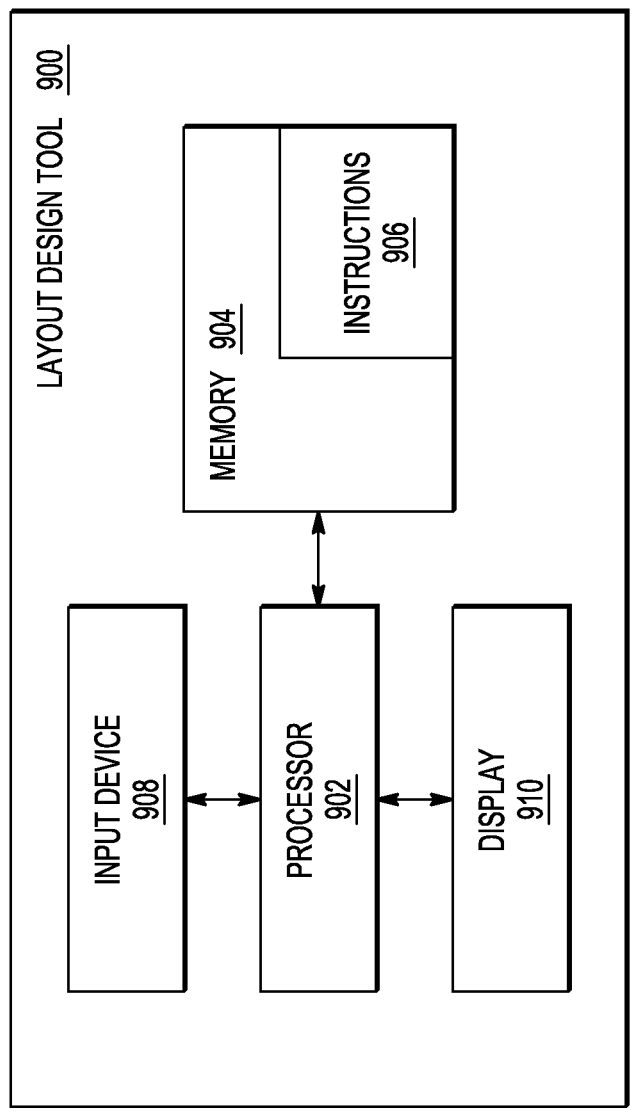
FIG. 9 depicts an exemplary layout design tool for implementing the method of FIG. 8.

FIG. 9 depicts an exemplary layout design tool 900 for implementing the method of FIG. 8. The layout design tool 900 may be a computer system including a set of instructions that, when executed, cause the computer system to perform the acts, steps, and other functions described above. The layout design tool 900 may operate as a standalone device or may be connected, e.g., using a network, to other computer systems or peripheral devices. In a networked deployment, the layout design tool 900 may operate as a server or as a client computer. The layout design tool 900 may be implemented as or incorporated into various computing devices, such as a personal computer, a tablet, a personal digital assistant or other mobile device, or any other machine capable of executing a set of instructions that specify actions to be taken by the machine. While the layout design tool 900 is illustrated as a single computer system, the terms "tool" and "system"

may include any number or collection of systems or devices that individually or jointly execute one or more sets of instructions to implement the methods described herein.

The layout design tool 900 includes a processor 902, such as a central processing unit (CPU), and a memory 904 in communication with, or otherwise coupled to, the processor 902. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as instructions 906 stored in the memory 904.

The memory 904 is or includes a computer-readable storage medium, such as a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 904 may include one or more memories or data storage devices. In one embodiment, the memory 904 includes a cache or random access memory for the processor 902. In alternative embodiments, the memory 904 is separate from the processor 902, such as a cache memory of a processor, the system memory, or other memory. The memory 904 may be an external storage device or database for storing data. Examples include a hard drive or other drive unit, such as a compact disc ("CD") or digital video disc ("DVD") drive unit, memory card, memory stick, floppy disc, universal serial bus ("USB") memory device, or any other device operative to store data. The memory 904 may communicate with the processor 902 and other components of the layout design tool 900 via a bus or other communication link.

The layout design tool 900 may include an input device 908 configured to allow a user to interact with any of the components of the computer system. The input device 908 may be a microphone, a keyboard, a cursor control device, such as a mouse, or a joystick, touch screen display, or touchpad, or any other remote control or other device operative to interact with the computer system.

The layout design tool 900 may include a display unit 910, such as a liquid crystal display (LCD), an organic light emitting diode (OLED), a flat panel display, a solid state display, a cathode ray tube (CRT), a projector, a printer or other now known or later developed display device for outputting determined information. The display 910 may act as an interface for the user to see the functioning of the processor 902, or specifically as an interface with the software stored in the memory 904.

The instructions 906 may include or specify a program, software, software application, script, or code. The instructions 906 may be written in any form of programming language, including compiled or interpreted languages. The instructions 906 be stored in any form, including as a standalone program or as a module, component, subroutine, or other unit suitable for use in a computing environment. The instructions 906 do not necessarily correspond to a file in a file system. The instructions 906 may be stored in a portion of a file that holds other programs or data (e.g., one or more scripts stored in a markup language document), in a single file dedicated to the program in question, or in multiple coordinated files (e.g., files that store one or more modules, sub programs, or portions of code). The instructions 906 may be stored or configured to be executed on one computer or on multiple computers that are located at one site or distributed across multiple sites and interconnected by a communication network.

In one aspect, a semiconductor device includes a substrate, an interconnect supported by the substrate, the interconnect having a width less than three times a minimum line dimension of the semiconductor device, and an extraneous conductive structure adjacent the interconnect to define a pair of segments of the interconnect. Each segment has a length no greater than a stress-induced void formation characteristic length of the interconnect.

In a second aspect, a method of fabricating a semiconductor device includes depositing a dielectric layer over a substrate, and forming an interconnect, the interconnect having a width less than three times a minimum line dimension of the semiconductor device. Forming the interconnect includes depositing a metal layer on the dielectric layer, and patterning the metal layer to define the interconnect and establish an extraneous conductive structure adjacent the interconnect. The extraneous conductive structure defines a pair of segments of the interconnect, each segment having a length no greater than a stress-induced void formation characteristic length of the interconnect.

In a third aspect, a computer-implemented method of configuring a semiconductor device includes identifying an interconnect having an interconnect path length greater than a stress-induced void formation characteristic length of the semiconductor device, and placing, with a processor, a conductive structure adjacent the interconnect to define a pair of segments of the interconnect. Each segment has a length no greater than a stress-induced void formation characteristic length of the interconnect, and the conductive structure is selected from the group consisting of a decoy via connected to the interconnect, a floating tile disposed along the interconnect, a tab that laterally extends outward from the interconnect, and a jumper from a first metal layer in which the interconnect is disposed to a second metal layer.

In a fourth aspect, a computer program product for configuring a semiconductor device includes one or more computer-readable storage media having stored thereon computer-executable instructions that, when executed by one or more processors of a computing system, cause the computing system to perform a method. The method includes identifying an interconnect having a width less than three times a minimum line dimension of the semiconductor device and having an interconnect path length greater than a stress-induced void formation characteristic length of the semiconductor device, and placing, with a processor, a conductive structure adjacent the interconnect to define a pair of segments of the interconnect. Each segment has a length no greater than a stress-induced void formation characteristic length of the interconnect, and the conductive structure is selected from the group consisting of a decoy via connected to the interconnect, a floating tile disposed along the interconnect, a tab that laterally extends outward from the interconnect, and a jumper from a first metal layer in which the interconnect is disposed to a second metal layer.

In a fifth aspect, a computer-implemented method of configuring a semiconductor device includes identifying an interconnect having a width less than three times a minimum line dimension of the semiconductor device and having an interconnect path length greater than a stress-induced void formation characteristic length of the semiconductor device, determining whether a first via space is available to add a redundant via to the interconnect at a position along the interconnect to define a pair of segments of the interconnect having respective lengths no greater than the stress-induced void formation characteristic length, and if the first via space is not available, determining whether a second space is available to add an extraneous conductive structure adjacent the interconnect at the position along the interconnect to define the pair of segments of the interconnect having respective lengths no greater than the stress-induced void formation characteristic length.

The present invention is defined by the following claims and their equivalents, and nothing in this section should be taken as a limitation on those claims. Further aspects and advantages of the invention are discussed above in conjunction with the preferred embodiments and may be later claimed independently or in combination.

While the invention has been described above by reference to various embodiments, it should be understood that many changes and modifications may be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A computer-implemented method of configuring a semiconductor device, the method comprising:
   identifying an interconnect having an interconnect path length greater than a stress-induced void formation characteristic length of the semiconductor device; and
   placing, with a processor, a conductive structure adjacent the interconnect to define a pair of segments of the interconnect;
   wherein each segment has a length no greater than the stress-induced void formation characteristic length of the interconnect; and
   wherein the conductive structure is selected from the group consisting of a decoy via connected to the interconnect, a floating tile disposed along the interconnect, a tab that laterally extends outward from the interconnect, and a jumper from a first metal layer in which the interconnect is disposed to a second metal layer.

2. The method of claim 1, wherein the conductive structure is not electrically connected to a circuit element of the semiconductor device other than the interconnect.

3. The method of claim 1, wherein the conductive structure is connected to the interconnect.

4. The method of claim 3, wherein the conductive structure comprises the decoy via.

5. The method of claim 3, wherein:
   the conductive structure comprises the jumper; and
   the first metal layer is free of a conductive structure that the jumper would bypass.

6. The method of claim 3, wherein:
   the conductive structure comprises the tab; and
   the tab selectively widens the interconnect at the tab.

7. The method of claim 6, wherein:
   the interconnect is one of a plurality of interconnects having respective segments disposed in parallel;
   the tab is one of a plurality of tabs, each tab being connected to a respective one of the plurality of interconnects; and
   the plurality of tabs are disposed in an axially staggered arrangement along the plurality of interconnects.

8. The method of claim 1, wherein the conductive structure is not connected to the interconnect.

9. The method of claim 8, wherein the conductive structure comprises the floating tile.

10. The method of claim 9, wherein an area within about five times the minimum line dimension of the semiconductor device and in which the segments and the floating tile are disposed is configured such that, without the floating tile, the area would have a metal coverage density of less than 50%.

11. The method of claim 1, wherein the conductive structure is noncontiguous with the interconnect.

12. The method of claim 1, wherein the stress-induced void formation characteristic length falls in a range from about 10 mm to about 25 mm.

13. A computer program product for configuring a semiconductor device, the computer program product comprising one or more non-transitory computer-readable storage media having stored thereon computer-executable instructions that, when executed by one or more processors of a computing system, cause the computing system to perform a method, the method comprising:
   identifying an interconnect having a width less than three times a minimum line dimension of the semiconductor device and having an interconnect path length greater than a stress-induced void formation characteristic length of the semiconductor device;
   placing a conductive structure adjacent the interconnect to define a pair of segments of the interconnect;
   wherein each segment has a length no greater than the stress-induced void formation characteristic length of the interconnect; and
   wherein the conductive structure is selected from the group consisting of a decoy via connected to the interconnect, a floating tile disposed along the interconnect, a tab that laterally extends outward from the interconnect, and a jumper from a first metal layer in which the interconnect is disposed to a second metal layer.

14. The computer program product of claim 13, wherein the conductive structure is not electrically connected to a circuit element of the semiconductor device other than the interconnect.

15. The computer program product of claim 13, wherein the conductive structure is connected to the interconnect.

16. The computer program product of claim 13, wherein the stress-induced void formation characteristic length falls in a range from about 10 mm to about 25 mm.

17. A computer-implemented method of configuring a semiconductor device, the method comprising:
   identifying an interconnect having a width less than three times a minimum line dimension of the semiconductor device and having an interconnect path length greater than a stress-induced void formation characteristic length of the semiconductor device;
   determining, with a processor, whether a first via space is available to add a redundant via to the interconnect at a position along the interconnect to define a pair of segments of the interconnect having respective lengths no greater than the stress-induced void formation characteristic length; and
   if the first via space is not available, determining, with the processor, whether a second space is available to add an extraneous conductive structure adjacent the interconnect at the position along the interconnect to define the pair of segments of the interconnect having respective lengths no greater than the stress-induced void formation characteristic length.

18. The method of claim 17, wherein the extraneous conductive structure comprises a decoy via electrically connected to the interconnect.

19. The method of claim 17, wherein the extraneous conductive structure comprises a floating tile along the interconnect.

20. The method of claim 17, wherein the extraneous conductive structure comprises a tab electrically connected to the interconnect.

* * * * *